United States Patent [19]
Lempel

[11] Patent Number: 5,978,909
[45] Date of Patent: Nov. 2, 1999

[54] SYSTEM FOR SPECULATIVE BRANCH TARGET PREDICTION HAVING A DYNAMIC PREDICTION HISTORY BUFFER AND A STATIC PREDICTION HISTORY BUFFER

[75] Inventor: Oded Lempel, Haifa, Israel

[73] Assignee: Intel Corporation, Santa Clara, Calif.

[21] Appl. No.: 08/979,579

[22] Filed: Nov. 26, 1997

[51] Int. Cl.⁶ .................................................... G06F 9/32
[52] U.S. Cl. ................................................. 712/240
[58] Field of Search .................................. 712/239, 240, 712/237, 238

[56] References Cited

U.S. PATENT DOCUMENTS

| | | | |
|---|---|---|---|
| 5,553,255 | 9/1996 | Jain et al. | 712/235 |
| 5,574,871 | 11/1996 | Hoyt et al. | 712/200 |
| 5,805,878 | 9/1998 | Rahman et al. | 712/239 |

OTHER PUBLICATIONS

Burch, Carl, PA–8000: A Case Study of Static and Dynamic Branch Prediction, Proceedings of the 1997 IEEE International Conference on Computer Design: VLSI in Computers and Processors, Oct. 12–15, 1997.

Atukorala, Shan, Branch Prediction Methods Used in Modern Superscalar Processors, Proceedings of 1997 International Conference on Information, Communications and Signal Processing, Sep. 9–12, 1997.

Yeh, Tse–Yu, Patt, Yale N., Alternative Implementations of Two–Level Adaptive Branch Prediction, Proceedings of the 19$^{th}$ Annual International Symposium on Computer Architecture, May 18–21, 1992.

Su, Ching–Long, Despain, Alvin M., Minimizing Branch Misprediction Penalties for Superpipelined Processors, Proceedings of the 27$^{th}$ Annual International Symposium on Microarchitecture, Nov. 30–Dec. 2, 1994.

*Primary Examiner*—Richard L. Ellis
*Attorney, Agent, or Firm*—Blakely, Sokoloff, Taylor & Zafman LLP

[57] ABSTRACT

A branch prediction unit includes a first branch target buffer, a second branch target buffer, and a static predictor. The first branch target buffer is adapted for storing a first plurality of branch history entries. The second branch target buffer is adapted for storing a second plurality of branch history entries. The static predictor is adapted for determining a static branch prediction for an encountered branch instruction. The second branch target buffer is further adapted to allocate a branch history entry based on the static prediction. A method for predicting program branches in a microprocessor includes fetching a program instruction to be executed by the microprocessor. It is determined if an entry corresponding to the program instruction is stored in a first branch target buffer, and if an entry corresponding to the program instruction is stored in a second branch target buffer. It is determined if the program instruction is a branch instruction. A static prediction is determined for the branch instruction. A branch history entry is allocated in the second branch target buffer based on the static prediction if the first and second branch target buffers do not contain entries corresponding to the program instruction.

33 Claims, 7 Drawing Sheets

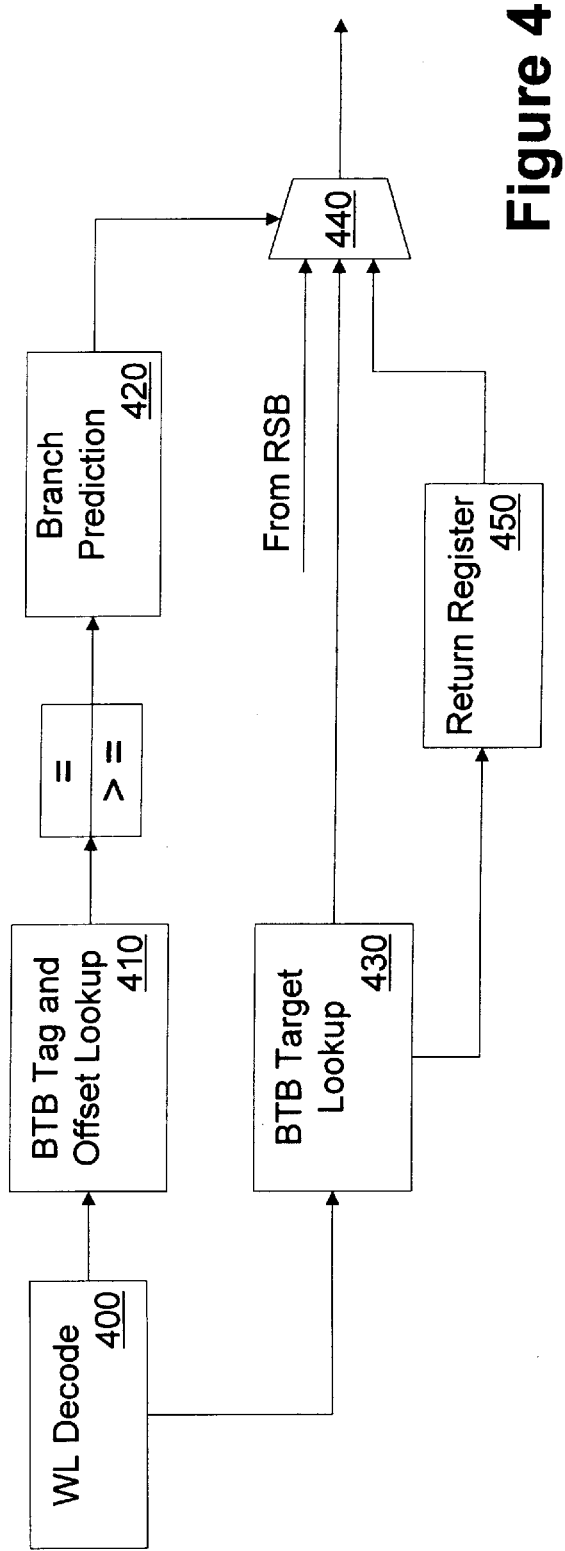

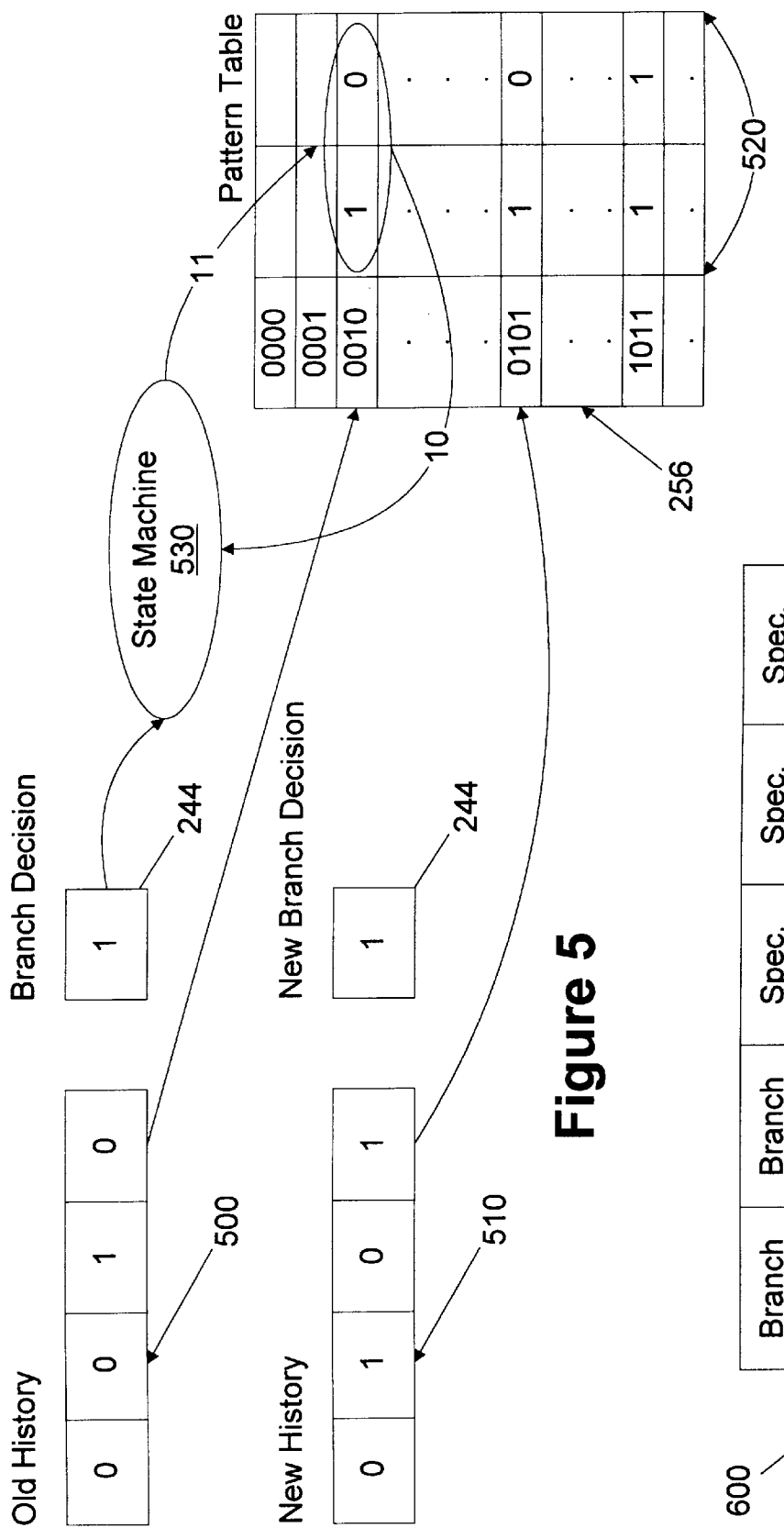

Figure 7

| Redirect IP | Target IP | Branch Type | Prediction | Dynamic Prediction | BLIP |
|---|---|---|---|---|---|
| 710 | 720 | 730 | 740 | 750 | 760 |

700

SYSTEM FOR SPECULATIVE BRANCH TARGET PREDICTION HAVING A DYNAMIC PREDICTION HISTORY BUFFER AND A STATIC PREDICTION HISTORY BUFFER

BACKGROUND OF THE INVENTION

1. Field of the Invention

The present invention relates generally to branch prediction in a microprocessor system and, more particularly, to a method and apparatus for speculatively buffering branch targets.

2. Description of the Related Art

The performance of a microprocessor is directly related to the amount of time it is busy executing instructions. It achieves maximum performance if it never sits idle waiting on fetches from memory or I/O. The microprocessor has a prefetch unit that has the responsibility of keeping the execution unit as busy as possible by providing a constant flow of instructions. The prefetch unit is responsible for keeping enough instructions on hand so the microprocessor does not stop its execution flow to fetch an instruction from memory. This look-ahead feature can significantly increase performance, because much of the time, the next instruction is already waiting at the first stage of the microprocessor execution pipeline. If instructions are sequentially stored, prefetching almost guarantees that the next instruction will always be ready.

However, instruction sequences are not always stored in memory sequentially. Software contains branches or jumps in instruction flow that cause the microprocessor to jump around to different sections of code depending on the task being executed. The prefetch unit can keep track of the current instruction flow, but it cannot predict the future path of branch instructions.

Performance of the microprocessor is further enhanced by a branch prediction unit that works in concert with the prefetch unit. The branch prediction unit, as its name suggests, attempts to predict whether a branch will be taken. As long as the branch prediction unit predicts correctly, the prefetch unit retrieves instructions to be executed in the required order.

In a microprocessor such as Intel's Pentium Pro microprocessor, the branch prediction unit includes a dynamic predictor, such as a branch target buffer, that stores branch history information based on the instruction address of the branch instruction. The branch target buffer tracks the past behavior of branches through history bits. The branch target buffer can track a branch instruction only after it has been previously seen and an entry has been allocated for the instruction address of the branch. Branch prediction typically occurs in the beginning of the microprocessor pipeline, and branch target buffer allocation typically occurs near the end of the pipeline after the branch is known to be in the correct path of the executing program and the branch is resolved. Therefore, the first time a branch instruction at a certain address is encountered, the branch target buffer does not know that the instruction is indeed a branch because the instruction has not been previously executed and allocated.

A second branch prediction unit, a static predictor, receives information on the decoded instructions and can therefore identify a branch instruction that is not detected by the branch target buffer. The static predictor can identify the type of branch instruction and possibly the branch target address. The static predictor performs a static branch prediction based on a set of rules depending on the type of branch instruction encountered. A branch missing the branch target buffer will be statically predicted by the static predictor. The static predictor is also capable of correcting errors made by the branch target buffer. Because, the branch target buffer tracks branches by instruction address rather than by knowing the actual instruction, process switches and self-modifying code can affect the actual instruction stored at a particular address. Branches that are incorrectly identified by the branch target buffer and branches that are missed by the branch target buffer can be corrected by the static predictor.

Due to the lag between encountering a branch instruction for the first time and allocating the branch in the branch target buffer after it is executed and retired, a particular branch may be encountered and statically predicted multiple times before it is ever allocated in the branch target buffer. In the case of a backward conditional branch, the static predictor will predict the branch as taken, resulting in the instructions following the branch that were fetched prior to the static prediction being flushed from the pipeline. Because the branch instruction is not allocated in the branch target buffer until after the instruction is retired, the static prediction and flush loop may be repeated multiple times before the first occurrence of the branch is allocated, especially for a short loop.

Flush cycles have a significant impact on processor performance. As processors become faster, the impact of flush cycles increases. Faster processors typically require deeper pipelines, thus increasing the lag between encountering a branch instruction and allocating the instruction address in the branch target buffer.

The present invention is directed to overcoming, or at least reducing the effects of, one or more of the problems set forth above by providing a novel and nonobvious method and apparatus for speculatively buffering branch targets.

SUMMARY OF THE INVENTION

An aspect of the invention is seen in a branch prediction unit that includes a first branch target buffer, a second branch target buffer, and a static predictor. The first branch target buffer is adapted for storing a first plurality of branch history entries. The second branch target buffer is adapted for storing a second plurality of branch history entries. The static predictor is adapted for determining a static branch prediction for an encountered branch instruction. The second branch target buffer is further adapted to allocate a branch history entry based on the static prediction.

Another aspect of the invention is seen in a method for predicting program branches in a microprocessor. The method includes fetching a program instruction to be executed by the microprocessor. It is determined if an entry corresponding to the program instruction is stored in a first branch target buffer, and if an entry corresponding to the program instruction is stored in a second branch target buffer. It is determined if the program instruction is a branch instruction. A static prediction is determined for the branch instruction. A branch history entry is allocated in the second branch target buffer based on the static prediction if the first and second branch target buffers do not contain entries corresponding to the program instruction.

BRIEF DESCRIPTION OF THE DRAWINGS

The foregoing and other advantages of the invention will become apparent upon reading the following detailed description and upon reference to the drawings in which:

FIG. 3c illustrates the internal organization of the cache located within the SBTB of FIG. 2;

FIG. 4 illustrates a block diagram of the structure of the branch target buffer (BTB) of the 3b;

FIG. 5 illustrates a stylized representation of a branch prediction operation performed by the BTB of FIG. 5;

FIG. 6 illustrates a stylized representation of a continuation of the branch prediction operation of FIG. 5;

FIG. 7 illustrates the internal organization of a Branch Resolution Table located within the static predictor of FIG. 2.

Figure 1:
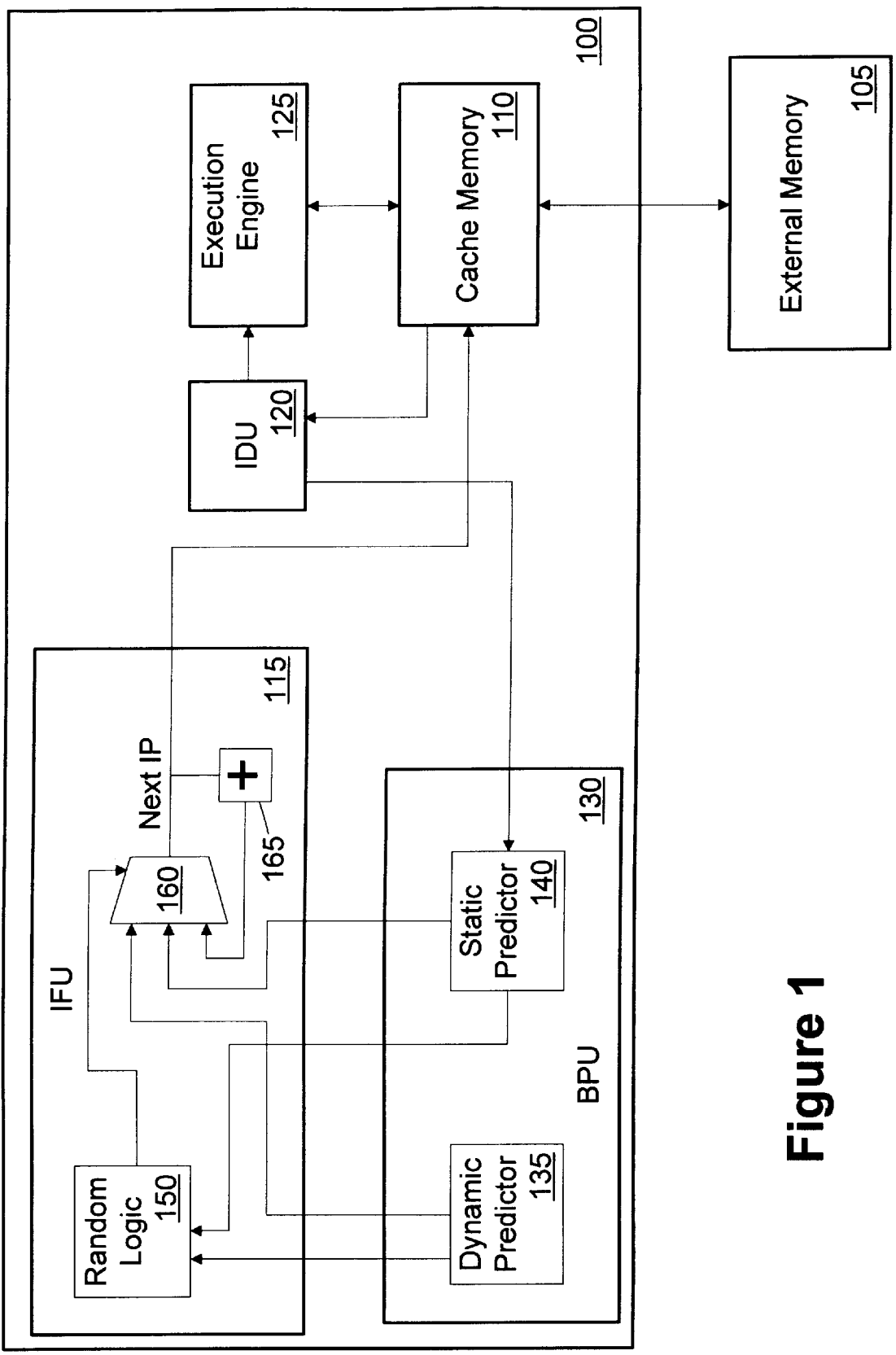
FIG. 1 illustrates a top-level block diagram of a microprocessor system interfaced with external memory.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The following examples are included to demonstrate preferred embodiments of the invention. It should be appreciated by those skilled in the art that the techniques disclosed in the examples that follow represent techniques discovered by the inventor to function well in the practice of the invention. However, those skilled in the art should, in light of the present disclosure, appreciate that many changes can be made in the specific embodiments disclosed herein without departing from the spirit and scope of the invention.

Turning now to the drawings and referring initially to FIG. 1, a microprocessor 100 is shown coupled to an external memory 105. The microprocessor 100 includes a cache memory 110, an instruction fetch unit (IFU) 115, an instruction decode unit (IDU) 120, an execution engine 125, and a branch prediction unit (BPU) 130. The BPU 130 includes a dynamic predictor 135 and a static predictor 140. Alternatively, the static predictor 140 may be included in the IDU 120.

Generally, the IFU 115 retrieves instructions from the cache 110, and delivers the retrieved instructions to the IDU 120, where they are decoded into execution vectors for execution by the execution engine 125. The BPU 130 analyzes the incoming instructions, identifies branch instructions, and predicts whether each branch will be taken. If a branch is predicted as being taken, it will have an influence on the address of the next instruction (Next IP) to be retrieved from the cache 110. Thus, the BPU 130 has a feedback path to the IFU 115.

The main function of the IFU 115 is to interface with the cache 110 by providing an instruction pointer (IP) and receiving instructions stored in the cache 110 (e.g., 32-byte lines). The IFU 115 generates the IP based on signals from the BPU 130. Ordinarily, the IFU 115 will serially retrieve each line of instructions to be executed from the cache 110. However, when a branch instruction is present, the IFU 115 determines whether the branch will be taken, so that, if necessary, instructions from the location to which the program will branch (target address) may be retrieved.

Figure 2:
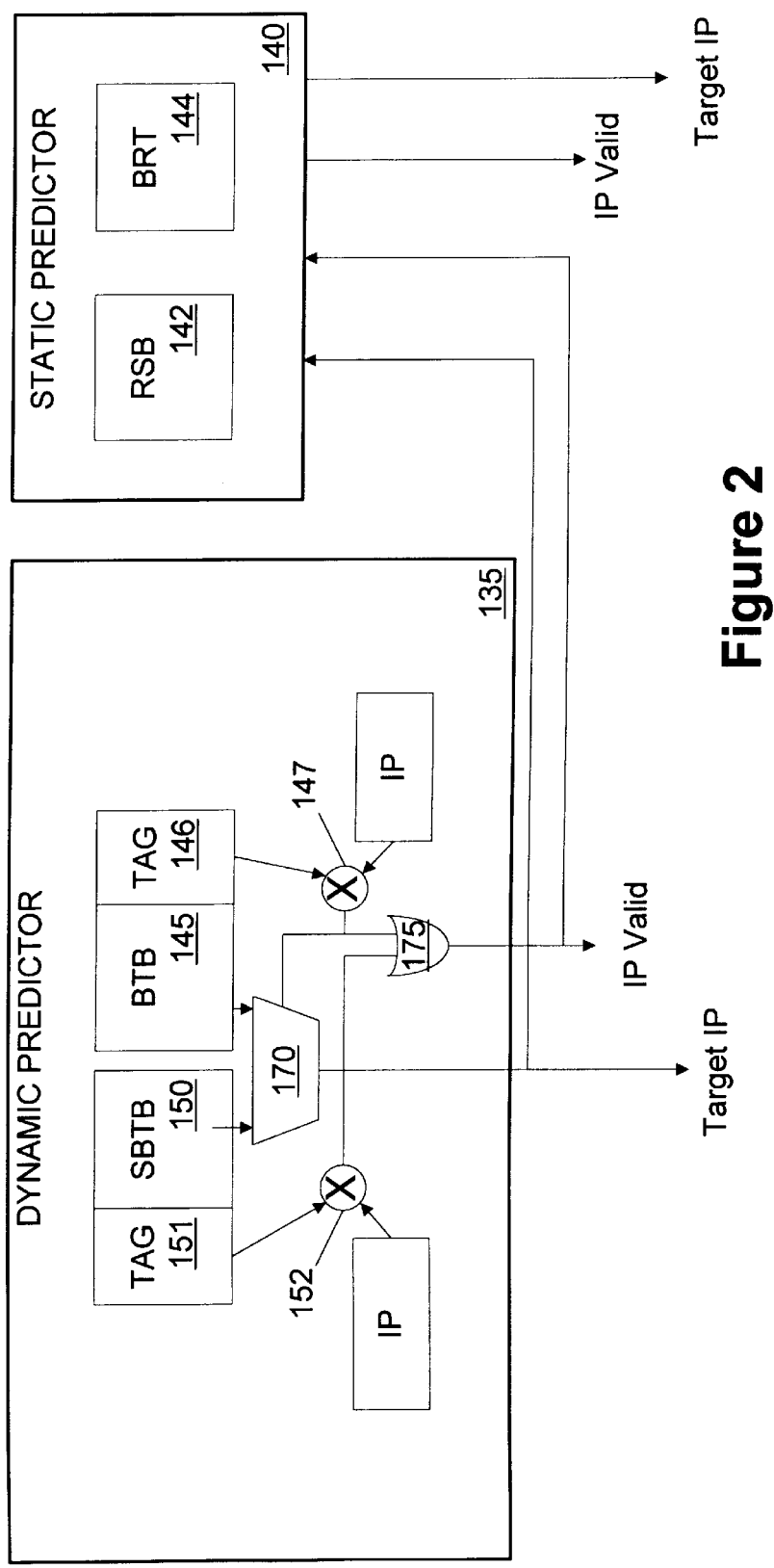
FIG. 2 illustrates a top-level block diagram of the branch prediction unit of the microprocessor of FIG. 1.

As shown in FIG. 2, the dynamic predictor includes a branch target buffer (BTB) 145, and a speculative branch target buffer (SBTB) 150. All instructions are passed through the static predictor 140 to identify the presence of a branch instruction. Entries are allocated into the BTB 145 after a branch instruction has been executed by the execution engine 125 and retired. Entries are allocated into the SBTB 150 after they are first identified by the static predictor 140. When an entry is allocated into the BTB 145, any corresponding entries in the SBTB 150 are deallocated to avoid prediction ambiguity.

The dynamic predictor 135 and static predictor 140 each provide an IP valid signal to the IFU 115 when a branch is detected in the current line of instructions retrieved from the cache 110. The static predictor 140 identifies the branch instruction after the instruction has been decoded in the IDU 120. Accordingly, the static predictor 140 might reside in the IDU 120 as opposed to being contained in the branch prediction unit 130 as described. The respective dynamic or static predictor 135, 140 that detected the presence of a branch instruction provides an alternative instruction pointer containing the predicted target address to where the program will branch, and signals the presence of the branch instruction to random logic 155 within the IFU 115. The random logic 155 responds to the IP valid signals from the dynamic or static predictor 135, 140 by outputting a signal to the select input of a multiplexer 160. The target IPs generated by the dynamic and static predictor 135, 140 are connected as inputs to the multiplexer 160. Thus, the random logic 155 supplies a select signal to the multiplexer 160 to select the target IP corresponding to the IP valid signal generated by the dynamic or static predictor 135, 140. The output of the multiplexer 160 becomes the Next IP and is delivered to the cache 110 to fetch the next instruction.

In the event that no branches are detected by the dynamic or static predictor 135, 140, execution of the program will continue in a serial fashion. Accordingly, the next IP is generated by indexing the current IP. An adder 165 receives the current IP, adds one to its value, and returns it as in input to the multiplexer 160. Thus, where no IP valid signals are received by the random logic 155, the multiplexer 160 select signal defaults to select the indexed IP and deliver it to the cache 110.

Turning now to FIGS. 2–6, the structure and operation of the dynamic predictor 135 is discussed in greater detail. The organization and function of the BTB 145 and SBTB 150 are similar with the exception of the allocation and deallocation policies. Branches are allocated in the BTB 145 after they have been verified in the execution stage. Branches are allocated in the SBTB 150 after they have been detected by the static predictor 140 and after they have missed in the BTB 145.

The BTB 145 in the illustrative embodiment has a four-way set associative, 512 entry cache. The SBTB 150 in the illustrative embodiment is an 8 entry, fully associative cache. The size of the SBTB 150 depends on design characteristics and cost benefit issues related to the microprocessor 100. Branches are alive in the SBTB 150 during the time between when they are identified by the static predictor 140 and the time they are finally executed and allocated into the BTB 145. Considering the case of one branch per cycle, and a pipeline that takes 16 cycles from identification to allocation in the BTB 145, a 16 entry SBTB 150 would be large enough to cover the worst case scenario. However, statically predicted branches often result in a partial pipeline flush, thus reducing the possible number of branches that could be encountered during the lifetime of the first branch. Accordingly, a smaller size is sufficient. In the illustrated embodiment, a fully associative arrangement was chosen for the SBTB 150 due to its small size. However, in cases where it would be more efficient an N-way set associative arrangement is also contemplated.

Each time the IFU 115 requests a line of code from the cache 110, the BTB 145 and SBTB 150 are looked up to determine if any known branches reside in the line of code being fetched. Previously encountered branches are stored in the BTB 145 and SBTB 150 based on the address of the last byte of the branch instruction. The BTB 145 and SBTB 150 do not interpret code, but rather they check the current IP against their respective entries to determine if matching branches have been previously allocated.

Figure 3A:
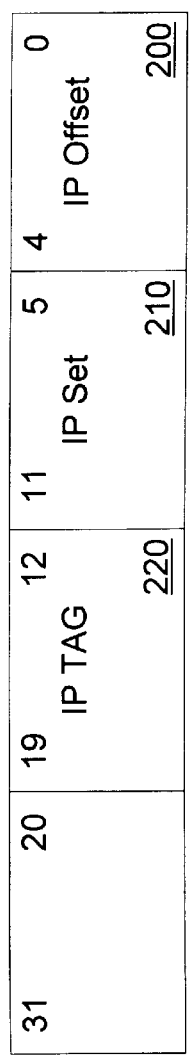
FIG. 3a illustrates the partitioning of an instruction pointer address to be used to address a cache located within the BTB of FIG. 2.

Referring briefly to FIG. 3a, the bit partitioning applied to an IP received from the IFU 115 for use with the BTB 145 is shown. Bits 0–4 are used as an IP offset 200. Bits 5–11 are used as an IP set 210. In the illustrated embodiment, bits 12–19 are used as an IP tag 220. However, it is contemplated that in some embodiments the IP tag 220 may comprise bits 12–31.

Figure 3B:
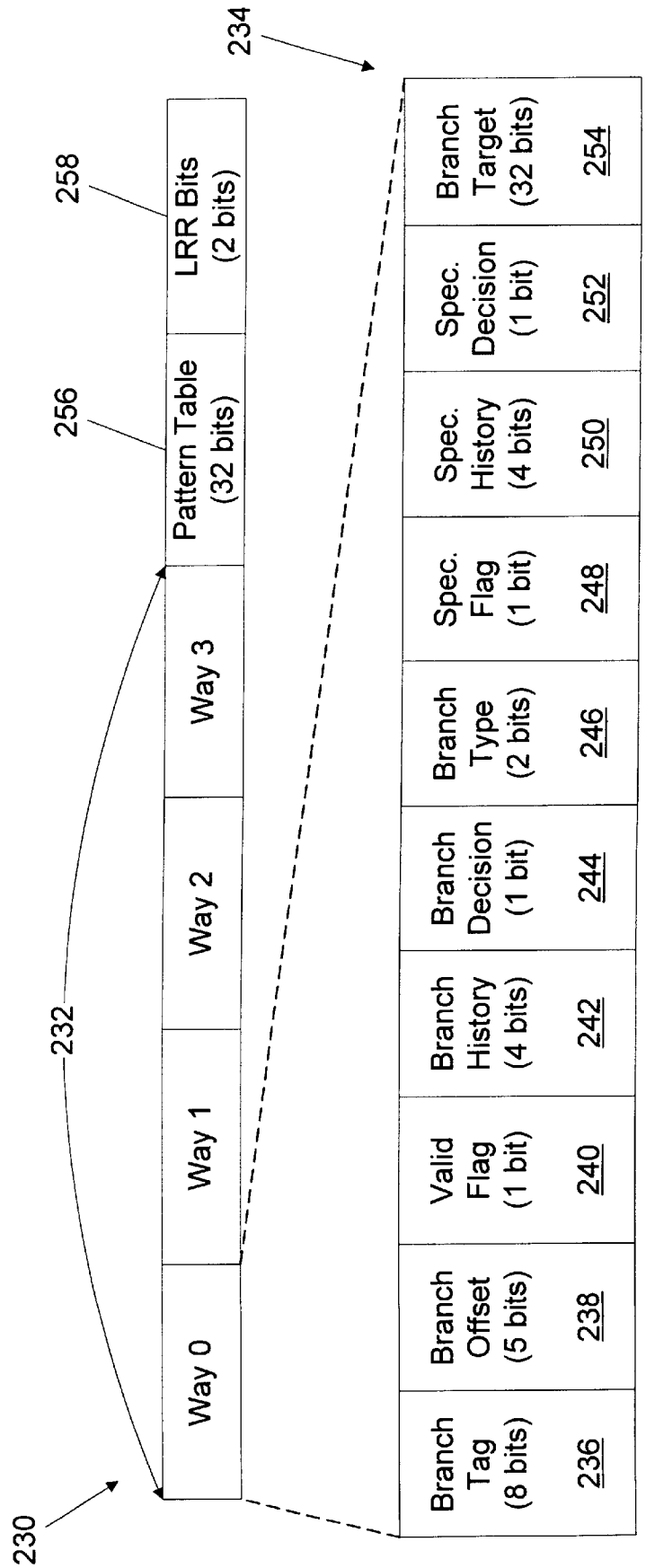
FIG. 3b illustrates the internal organization of the cache located within the BTB of FIG. 2.

FIG. 3b shows the fields that comprise each set 230 within the BTB 145. Each set 230 contains four ways 232. Each way 232 holds a single BTB entry 234. There are 128 sets 230 contained in the BTB 145, resulting in 512 total BTB entries 234. Each BTB entry 234 comprises a branch tag 236 (8 bits), a branch offset 238 (5 bits), a valid flag 240, (1 bit), a branch history 242 (4 bits), a branch decision 244 (1 bit), a branch type 246 (2 bits), a speculative flag 248 (1 bit), a speculative history 250 (4 bits), a speculative decision 252 (1 bit), and a branch target 254 (32 bits). Each set 230 also contains a pattern table 256 and a least recently replaced (LRR) field 258.

FIG. 3c shows the fields that comprises an entry 300 within the SBTB 150. Each SBTB entry 300 comprises a branch tag 302 (20 bits), a valid flag 304, (1 bit), a branch history 306 (4 bits), a branch decision 308 (1 bit), a branch type 310 (2 bits), and a branch target 312 (32 bits). In the illustrative embodiment, the branch tag 302 is shown as 20 bits as representative of a fully-associative SBTB 150 arrangement. It is contemplated that a lesser number of bits may be sufficient to identify SBTB entries 300. Similar to the BTB set 230, an SBTB entry 300 also has an associated pattern table (not shown) and LRR field (not shown). For example, if the SBTB 150 were organized in a 4 way, set associative arrangement similar to the BTB 145, the fields in the SBTB entry 300 shown in FIG. 3c could be inserted in place of the BTB entry 234 shown in FIG. 3b.

The BTB 145 tracks both actual branch history and speculative branch history after a branch instruction has been identified and allocated. The SBTB 150 tracks branch history for those branches that are not stored in the BTB 145 after they have been identified by the static predictor 140, but before the branch instruction is executed and allocated in the BTB 145. For example, the first time a branch is encountered, it will miss both the BTB 145 and the SBTB 150 because it has not been previously seen. The static predictor 140 will receive information on the decoded instruction from the IDU 120, thus allowing the branch to be identified. The entry is allocated in the SBTB 150. Future occurrences of the branch instruction will be identified and tracked by the SBTB 150. Eventually, the branch instruction will be executed by the execution engine 125 and an entry will be allocated in the BTB 145 after the branch outcome is known. The BTB 145 will then take over tracking actual and speculative history for the branch instruction, and the corresponding entry in the SBTB 150 will be deallocated. In one embodiment, the branch history bits 306 stored in the SBTB entry 300 are not used after the entry is deallocated. In an alternative embodiment, the branch history bits 306 stored in the SBTB entry 300 may be copied into the BTB 145 speculative history bits 250 of the BTB entry 234.

The following discussion details the operation of the BTB 145. The SBTB 150 operates in a similar manner with the exceptions noted.

Referring to FIG. 4, The IP received from the IFU 115 is partitioned as described above in reference to FIG. 3a by a WL Decode module 400. The IP set 210 has 7 bits, corresponding to a decimal number from 0 to 127. The IP set 210 indicates the set 230 in the BTB 145 to be evaluated. Lookup module 410 matches the IP set 210 to the corresponding set 230 stored in the BTB 145. The four BTB entries 234 (one for each way 232) in the matched set 230 are evaluated. All BTB entries 234 with a valid flag 240 equal to zero are discarded. Then all BTB entries 234 having a branch tag 236 that does not match the IP tag 220 are discarded. Of the remaining BTB entries 234, only those having an IP greater than or equal to the IP received from the IFU 115 (calculated using the branch offset 238) are considered for prediction. The BTB entries 234 still eligible for consideration are evaluated by the branch prediction module 420. The branch prediction module 420 selects the entries having a predicted taken branch decision 244. Of those predicted taken branches, the BTB entry 234 having the smallest branch offset 238 is chosen. If no taken branches are predicted, the BTB 145 does not provide an IP valid signal to the random logic 155.

If a taken branch is predicted by the BTB 145, target lookup module 430 determines the branch target address corresponding to the BTB entry 234 selected by the branch prediction module 420. The branch target passes through a BTB multiplexer 440. An IP valid signal is supplied to the random logic 155, and the branch target is supplied to the IP multiplexer 160 to indicate that the BTB 145 has detected a branch.

A similar look up is completed in the SBTB 150. Referring to FIG. 2, tag lookups are conducted in the BTB tag array 146 and SBTB tag array 151. The BTB 145 and SBTB 150 entries are compared to the IP received from the IFU 115 in a BTB comparator 147 and a SBTB comparator 152, respectively. The target address from either the BTB 145 or SBTB 150 is provided to a multiplexer 170. The IP Valid signal is provided by an OR gate 175 based on signals from the respective comparators 147, 152. Because of the partial tag lookups conducted in the BTB 145 aliasing can occur and it is possible that both the BTB 145 and the SBTB 150 will provide a hit. In that case, the multiplexer 170, which is controlled by the hit signal from the BTB comparator 147, will choose the BTB 145 prediction. If the BTB comparator 147 does not register a hit, the multiplexer 170 will default to the SBTB 150 target address. It is also contemplated that, alternatively, the SBTB comparator 152 may be used to control the multiplexer 170, depending on the specific system architecture and the sizes of the BTB 145 and SBTB 150. For example, if the SBTB 150 included full tag information on the instruction address and the BTB 145 included partial tag information, then the SBTB comparator 152 could be used to control the multiplexer 170. If full address matching were used for both the BTB 145 and the SBTB 150 aliasing would not occur, and the BTB 145 and SBTB 150 would be mutually exclusive.

Returning to FIG. 4, the branch type 246 bits indicate the type of branch the BTB 145 has predicted (branch type bits 310 for SBTB 150). The four types of branches that can be indicated with the branch type bits 246, 310 are conditional, return, call, and unconditional. If the BTB 145 detects a call type of branch, it stores the address of the instruction immediately following the call in a return register (RR) 450. The return address is computed by taking the current instruction pointer and adding the length of the call instruction plus one. The SBTB 150 may also include its own return register (not shown) or may share the RR 450 with the BTB 145. The specific implementation depends on system architecture parameters such as the pipeline depth and relationship between the locations of the BTB 145, SBTB 150, and static predictor 140 in the pipeline.

In the illustrated embodiment, the RR 450 is a 33 bit register, having two fields. The address field (32 bits) stores the address of the instruction following the call, and the valid field (1 bit) indicates that the address stored in the address field is valid. The RR 450 stores only the return address associated with the last call. The RR 450 valid field is set to zero (invalid) when the RR 450 address field is selected as a return target or when a branch misprediction is detected.

If the BTB 145 detects a return type of instruction, it uses the address in the return register 450, if valid, as the target address for the next instruction. If the RR 450 is not valid, the static predictor 140 supplies the return target through its return stack buffer (RSB) 142, as described below in reference to FIG. 2.

FIG. 5 illustrates the branch prediction algorithm used by the BTB 145 and the SBTB 150. The branch prediction algorithm relies on the two-level adaptive training algorithm developed by Tse-Yu Yeh and Yale N. Patt. Again, the description of the algorithm is provided for illustrative purposes. It is contemplated that other dynamic prediction algorithms may be employed. The algorithm is described in the context of the BTB 145. The SBTB 150 uses a similar implementation except as noted. The dynamic prediction algorithm described for the BTB 145 and the SBTB 150 are provided for illustrative purposes. Either on or both of the BTB 145 and SBTB 150 may be implemented using another dynamic prediction algorithm.

Branch history bits 242 are kept for each BTB entry 234. The branch history bits 242 are based on the outcome of actual branches, not predicted branches. The branch history bits 242 are updated only after the final outcome of the branch is known, as a result of the branch resolution done in the execution stage. The speculative history bits 250 are updated after each predicted branch outcome. To illustrate the prediction process, FIG. 5 shows a BTB entry 234 having an old branch history 500 of 0010. Assuming the branch decision 244 was verified in the execution stage as being taken, the new branch history 510 becomes 0101, which is obtained by shifting the branch decision 244, 1, into the least significant bit and discarding the most significant bit of the old branch history 500.

Each set 230 of entries 234 in the BTB 145 has an associated pattern table 256, as shown in FIG. 3b. An expanded pattern table 256 is shown in FIG. 5. The 16 lines in the pattern table 256 correspond to the 16 possible patterns for the branch history 242 or the speculative history 250.

The two bit pattern table (PT) entries 520 correspond to states of the Lee and Smith 2-bit saturating up/down counter scheme, in which 00 indicates strongly not taken, 01 indicates weakly not taken, 10 indicates weakly taken, and 11 indicates strongly taken. The PT entries 520 are incremented for a taken branch and decremented for a not taken branch by a state machine 530. For example, if the PT entry 520 was 01 (weakly not taken) and a branch taken was verified, the PT entry 520 would increment to 10 (weakly taken). A subsequent branch taken would increment the PT entry 520 to 11 (strongly taken). Conversely, if the entry 520 was 01 (weakly not taken) and a branch not taken was verified, the PT entry 520 would decrement to 00 (strongly not taken). The PT entry 520 can not be incremented above 11 (strongly taken) or below 00 (strongly not taken). For example, if a branch taken were to be verified with the PT entry 520 at 11, the PT entry 520 would be saturated and would remain at 11.

In the example illustrated in FIG. 5, the old branch history 500 of 0101 is used as an index to the pattern table 256, which has a PT entry 520 value of 10 (weakly taken). Because the branch was verified as taken, the PT entry 520 is incremented by the state machine 530 to 11 (strongly taken). The new branch history 510 is used to index the pattern table, yielding a PT entry 520 of 10. The most significant bit of the PT entry 520 corresponding to the new branch history 510 is used to set the branch decision 244 for the BTB entry 234 being updated.

The speculative history bits 250 are handled in a manner similar to that of the branch history bits 242. Referring to FIG. 6, a sample BTB entry 600 is shown. Only the fields required to illustrate this example are shown. Assume the BTB entry 600 was updated as described above in reference to FIG. 5. Subsequent to the update, the IFU 115 supplies an IP to the BTB 145 which corresponds to the BTB entry 600 shown in FIG. 6.

Because the speculative flag 610 is 0, the branch decision bit 620, rather than the speculative decision bit 640, is used by the branch prediction module 420 to evaluate the branch as being taken. This taken evaluation has not yet been verified in the execution stage, so only the speculative history bits 630 are updated. The taken decision, 1, becomes the least significant bit of the speculative history 630, and the remaining bits are shifted to the left with the most significant bit being discarded, resulting in a new speculative history 630 of 1011. The speculative flag 610 is set to 1, to indicate that the entry 600 has been updated speculatively. The speculative decision 640 is set to 1 corresponding the most significant bit of the PT entry 620 (11) associated with the speculative history 630 of 1011.

As stated above, the branch history 650 and PT entry 520 are not updated for speculative updates. Only if the speculative branch taken decision predicted in the foregoing example was verified during execution, would the branch history 650 and pattern table 520 be updated. If subsequent to this speculative update, the IFU 115 supplies an IP to the BTB 145, which again corresponds to the BTB entry 600 shown in FIG. 6, the speculative decision bit 640 would be used by the branch prediction module 420 to evaluate the branch, because the speculative flag 610 was set to 1 above. If a branch verified in the execution stage was mispredicted, the branch history 650 is updated as described above, the branch history 650 is copied into the speculative history bits 630, and the speculative flag 610 is set to zero.

Entries 234 are allocated and de-allocated in the BTB 145 as information is received concerning the actual resolution of branch instructions. Entries 234 are de-allocated (i.e., valid flag 240 set to zero) if the static predictor 140 detects that the BTB 145 has predicted a bogus branch (i.e., the decoded instruction is not a branch). The detection of bogus branches is described below.

As stated above, branches are stored in the BTB 145 based on the address of the last byte of the branch instruction. The static predictor 140 maintains a Branch Resolution Table 144 (BRT) shown in FIGS. 2 and 7. If a branch is to be updated the address of the last byte of the branch instruction (BLIP) 760 is received from the BRT 144 and the BTB 145 is queried to determine if a corresponding BTB entry 234 exists. The BLIP is partitioned as shown in FIG. 3a. The BLIP set bits indicate the set 230 to be evaluated in the BTB 145.

If the BLIP tag and BLIP offset matches the branch tag 236 and the branch offset 238 of a corresponding BTB entry 234, the branch history bits are updated as described above.

If the BLIP tag and BLIP offset do not match the branch tag 236 and branch offset 238 of a BTB entry 234 in a corresponding set, a new entry is allocated. The LRR bits 258 of the set 230 being evaluated point to the way 232 in the set 230 that has been least recently replaced (ie., oldest). If the branch tag 236 of the LRR way 232 does not match the IP tag 220 of the BLIP, the entry is replaced. If the branch tag 236 of the LRR way 232 matches the IP tag 220 of the BLIP, the LRR 258 is incremented and the next way 232 is checked. If the IP tag 220 of the BLIP matches the branch tag 236 for all four ways 232, the entry pointed to by the LRR 258 is replaced and the LRR 258 is incremented by one. If any of the valid flags 240 are set to zero, the invalid entry may be used in favor of the LRR way 232.

The BLIP is also used to access the SBTB 150. If a matching SBTB entry 300 is identified, the entry is deallocated to avoid prediction ambiguity between the BTB 145 and the SBTB 150.

In the event the BTB 145 or SBTB 150 is reset, the valid bit is set to zero for all entries in all sets, the pattern table is set to a predetermined pattern, and the LRR field is set to 00.

As described above the dynamic predictor 135 does not actually decode the instruction associated with a given IP. The dynamic predictor 135 is not flushed on process switches. Accordingly, the dynamic predictor 135 may use information from an earlier process for the current process. Self-modifying code may also modify an instruction. Because of the situations described above, branches may be missed, branches may be mispredicted, and/or branch targets may be incorrect. Therefore, branch predictions made by the dynamic predictor 135 are verified by the static predictor 140. The functions of the static predictor 140 are described by referring to FIGS. 2, 7, and 8.

Figure 8:
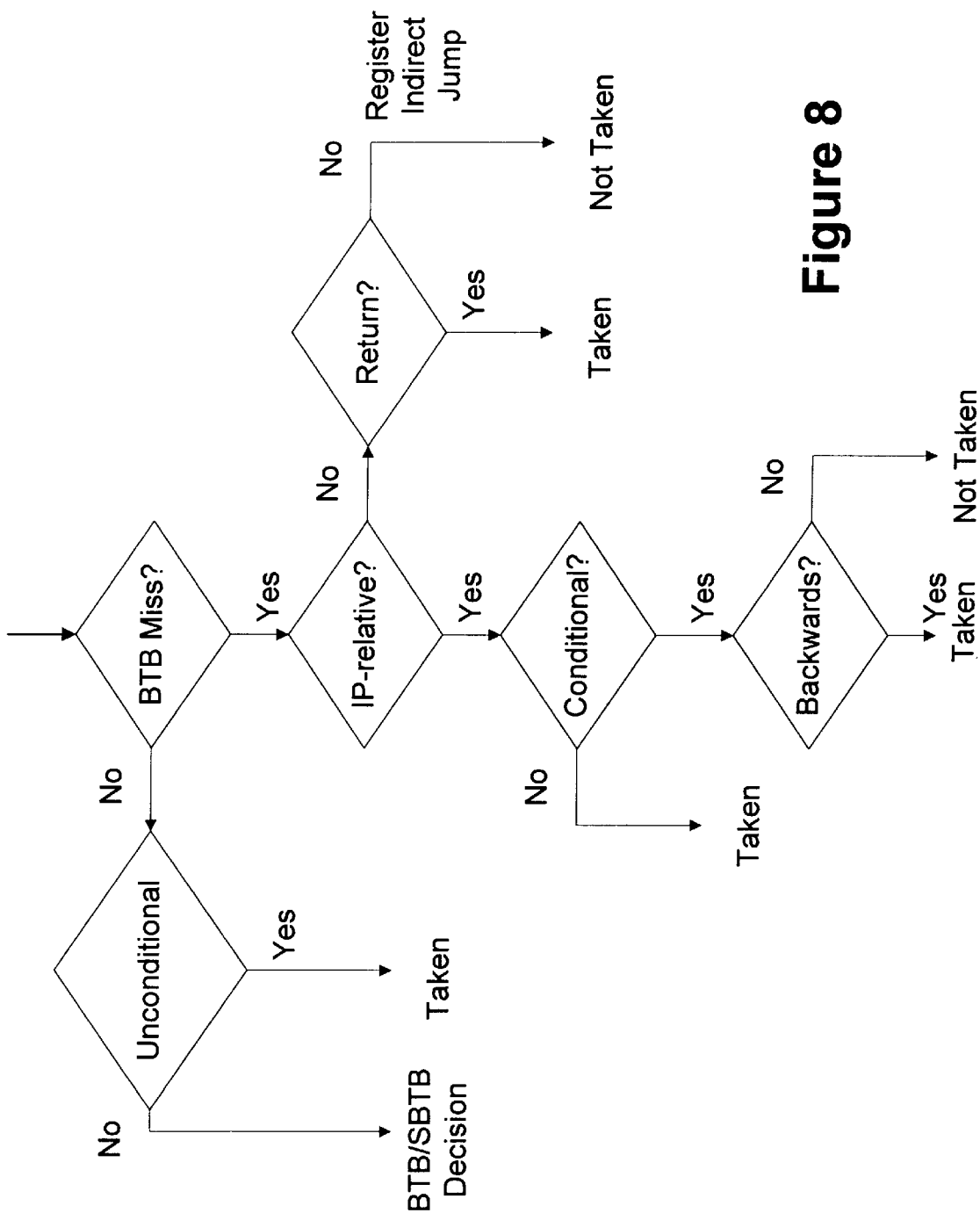
FIG. 8 illustrates a block diagram of the static prediction algorithm used by the dynamic predictor of FIG. 2.

The dynamic predictor 135 prediction of a branch is forwarded to the static predictor 140 for verification and correction, if necessary. The static predictor 140 receives opcode information from the IDU 120. Based on the opcode, which reflects the actual commands to be executed, the static predictor 140 provides a verification and correctness mechanism for branches whose target can be determined solely from the instruction itself. If a branch is missed by the dynamic predictor 135, the static predictor 140 predicts the branch decision using a static prediction algorithm. One such static prediction algorithm is illustrated in FIG. 8. If the dynamic predictor 135 predicts a branch, the static predictor 140 verifies the branch decision. The static predictor 140 re-steers the IFU 115 with the correct IP whenever the dynamic predictor 135 prediction is wrong or when the dynamic predictor 135 fails to predict a branch due to a miss.

The static predictor 140 receives information from the IDU 120 regarding the instruction type and instruction length. The static predictor 140 can determine certain branch characteristics from this information. The static predictor 140 responds according to the type of branch detected or missed by the dynamic predictor 135. Branches can be conditional (depending on certain criteria which must be evaluated prior to making the branch decision) or unconditional (program will always branch at this point). Branches can also be relative (target address of the branch is contained within the branch instruction) or indirect (target address depends on a value stored in a register or memory). The terms relative and direct are used interchangeably in this specification to indicate branches wherein the target address is contained within the branch instruction.

A call is a type of branch, wherein the program branches to a new address to complete a series of steps until a return is encountered. The return sets the IP to the step following the initial call. Therefore, the target address of the return is dependent on the address of the call. The target addresses for return instructions are stored in the return stack buffer (RSB) 142 of the static predictor 140. The RSB 142 is a first in, first out (FIFO) stack that keeps track of the return addresses of near call instructions. The dynamic predictor 135 and the static predictor 140 maintain separate pointers into the RSB 142.

For branches detected by the dynamic predictor 135, the static predictor 140 validates either the branch decision or the target address. The static predictor 140 deals with the complication of self modifying code (SMC) or task switches that can change the instruction bytes in the linear address space, thereby invalidating the dynamic predictor 135 branch prediction.

For branches that are missed by the dynamic predictor 135, the static predictor 140 makes the branch prediction. In the exemplary static prediction algorithm of FIG. 8, the static predictor 140 predicts "taken" for conditional backward branches and unconditional branches and provides the target address as the Next IP. The static predictor 140 predicts "not taken" for forward conditional branches. An IP Valid signal is also supplied to the random logic 155 to indicate the static predictor 140 correction.

For return branches that are predicted by the dynamic predictor 135, the dynamic predictor 135 predicted target (which was supplied by either the RR 550 or the RSB 142 as described above) is compared to the entry in the RSB 142 indicated by the pointer maintained by the static predictor 140. If the dynamic predictor 135 target is correct no changes are made, but if the dynamic predictor 135 target is incorrect, the target determined by the static predictor 140 is provided as the Next IP. If the return branch missed the dynamic predictor 135, the target determined by the static predictor 140 is provided as the Next IP.

For indirect branches that are predicted by the dynamic predictor 135, the static predictor 140 validates the branch decision. Because the actual target resides either in a register or in memory, the validation of the predicted target must be completed during the execution stage. The execution engine 125 compares the dynamic predictor 135 predicted target to the actual target. If the target is mispredicted, the actual target from the register or memory location is sent as the Next IP.

For indirect branches that are missed by the dynamic predictor 135, the static predictor 140 predicts the branch as taken and the next sequential IP is compared to the actual target by the execution engine 125. If the target is mispredicted, the actual target from the register or memory location is sent as the Next IP.

All branches detected by the static predictor 140 are stored in the branch resolution table (BRT) 144. The BRT 144 is a circular FIFO buffer. It is used during branch resolution to determine the linear instruction pointer for the corrected instruction flow in case of a branch misprediction. The BRT 144 uses a head pointer for allocation and a tail pointer for deallocation. Branches are allocated in the BRT 144 in program order. The contents of a BRT entry 700 are shown in FIG. 7. The fields include a Redirect IP 710 (32 bits), a Target IP 720 (32 bits), a Branch type 730 (2 bits), a prediction 740 (1 bit), a dynamic prediction 750 (1 bit), and the BLIP 760 (20 bits).

The Redirect IP 710 is the IP which is opposite the predicted target (i.e., the target to which the IFU 115 should be redirected to if the branch prediction is incorrect). For predicted taken branches, the Redirect IP 710 is the actual target address IP, and for predicted not taken branches, it is the target IP of the predicted not taken branch. The static predictor 140 provides the Redirect IP 710 for all branches but indirect branches. For indirect branches the static predictor 140 receives the target IP from the execution engine 125.

The target address calculated by the static predictor 140 is installed as the Target IP 720 for all branches except indirect branches. The Branch type 730 represents either jump, call, or return branches. The branch type 730 is supplied to the static predictor 140 by the IDU 120. The prediction 740 indicates the prediction of the branch, and is used for updating the history bits of the dynamic predictor 135 as described above. The dynamic prediction bit 750 indicates if a branch was predicted by the dynamic predictor 135. Dynamic predictor 135 lookup is not necessary if the branch was missed by the dynamic predictor 135. However, if the branch was predicted by the dynamic predictor 135 (i.e., dynamic prediction equals one), the dynamic predictor 135 is updated as described above (entries in the BTB 145 and SBTB 150 are updated and/or deallocated). The purpose of the dynamic prediction bit 750 is to avoid looking up the entry in the dynamic predictor 135 if the branch was not detected. The BLIP field 760 represents the IP of the last byte of the branch instruction. This value is used by the dynamic predictor 135 to allocate entries and to update the BTB history bits 242 as described above.

In the illustrated embodiment, relative branches that are predicted taken are allocated into the SBTB 150. Because the target addresses of indirect branches are not known by the static predictor 140, they are not allocated. The target addresses for return branches are maintained in the RR 450 and RSB 142. If the return address is known, the return branch, in effect, becomes a direct branch. It is contemplated that return branch instructions may also be allocated and tracked by the SBTB 150.

The functions of the BPU 130 have been described in detail. To summarize these functions, the IFU 115 attempts to fetch instructions in advance that will be needed by the execution engine 125. The BPU 130 analyzes these instructions to identify if any possible program branches exist in the program stream. The BTB 145 compares the current instruction to previously encountered branches to look for a match. The BTB 145 predicts the branch decision and branch target address based on the past branches it has seen. Entries are allocated into the BTB 145 after they have been executed and are known to be in the correct program path. Entries are allocated into the SBTB 150 after they are first identified by the static predictor 140, and deallocated when a corresponding entry is allocated in the BTB 145. The static predictor 140 receives actual opcode information on the instruction to verify and/or correct the dynamic predictor 135 predictions or misses. The BRT 144 keeps track of branches until they are resolved in the execution stage so that the BTB 145 and SBTB 150 can be updated. The BRT 144 also holds target information needed in the event of branch misprediction.

An example illustrating some advantages of a dynamic predictor 135 having both a BTB 145 and a SBTB 150 is described. For the illustrative example, consider a 2-way superscalar pipeline 14 stages deep. Branches are allocated into the BTB 145 in the 11th stage, and static prediction is evaluated in the 6th stage. Assuming a short code loop containing 4 instructions. First consider the case without using a SBTB 150.

At T=0, the first two instructions in the loop are fetched (1st iteration).

At T=1, the next two instructions in the loop are fetched (including the loop backward branch instruction of the first iteration).

At T=5, the backward branch reaches the static prediction stage and is predicted taken.

All sequential instructions fetched from T=2 to T=5 are flushed (in the wrong path).

At T=6, the first two instructions in the loop are fetched (2nd loop iteration).

At T=11, the backward branch of the second iteration reaches the static prediction stage, is predicted taken, and the sequential instructions are again flushed. Also, the backward branch of the first iteration finally reaches the allocation stage and is allocated into the BTB 145.

At T=12, the first two instructions in loop are fetched (3rd iteration).

At T=13, the next two instructions including the loop backward are fetched. The BTB 145 identifies the branch and predicts it taken.

Now consider the above scenario using the SBTB 150.

At T=0, the first two instructions in the loop are fetched (1st iteration).

At T=1, the next two instructions in the loop are fetched (including the loop backward branch instruction of the first iteration).

At T=5, the backward branch reaches the static prediction stage and is predicted taken. An entry is allocated in the SBTB 150 for the branch.

All sequential instructions fetched from T=2 to T=5 are flushed (in the wrong path).

At T=6, the first two instructions in the loop are fetched (2nd loop iteration).

At T=7, the next two instructions including the loop backward are fetched. The SBTB 150 identifies the branch and predicts it taken.

At T=8, the first two instructions in the loop are fetched (3rd loop iteration).

At T=9, the next two instructions including the loop backward are fetched. The SBTB 150 identifies the branch and predicts it taken.

At T=10, the first two instructions in the loop are fetched (4th loop iteration).

At T=11, the next two instructions including the loop backward are fetched. The SBTB 150 identifies the branch and predicts it taken.

Also, at T=11, The backward branch of the first iteration reaches the allocation stage and is allocated into the BTB 145. The corresponding entry in the SBTB 150 is deallocated.

At T=12, the first two instructions in the loop are fetched (5th loop iteration).

At T=13, the next two instructions including the loop backward are fetched. The BTB 145 identifies the branch and predicts it taken.

In the first scenario, two 4-cycle flushes occurred at T=5 and T=11. Using the SBTB 150, the flush at T=11 was avoided, thus saving 4 cycles. As pipelines become deeper, the latency between static prediction and allocation into the BTB 145 will increase, thus compounding the efficiency gain achieved above in the illustrative example.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A branch prediction unit, comprising:
   a first branch target buffer adapted for storing a first plurality of branch history entries;
   a second branch target buffer adapted for storing a second plurality of branch history entries; and
   a static predictor adapted for determining a static branch prediction for an encountered branch instruction, wherein the second branch target buffer is further adapted to allocate a branch history entry based on the static prediction.

2. The branch prediction unit of claim 1, wherein the second branch target buffer is further adapted to allocate a branch history entry based on the static prediction when the encountered branch instruction does not have a corresponding branch history entry in the first branch target buffer.

3. The branch prediction unit of claim 1, wherein at least one of the first branch target buffer and the second branch target buffer comprises an N-way set associative cache.

4. The branch prediction unit of claim 1, wherein the second branch target buffer comprises a fully associative cache.

5. The branch prediction unit of claim 1, wherein the entries in the second target buffer are indexed by at least a portion of an instruction address.

6. The branch prediction unit of claim 1, wherein the entries in the first target buffer are indexed by at least a portion of an instruction address of the encountered branch instruction.

7. The branch prediction unit of claim 1, wherein the first branch target buffer is further adapted to receive an executed outcome associated with the encountered branch instruction and allocate a branch history entry based on the executed outcome.

8. The branch prediction unit of claim 7, wherein the second branch target buffer is adapted deallocate the branch history entry associated with the encountered branch instruction based on the executed outcome.

9. The branch prediction unit of claim 7, wherein the static predictor includes a branch resolution table adapted for storing the executed outcome.

10. The branch prediction unit of claim 1, wherein the encountered branch instruction comprises a call instruction having an instruction address and a length, further comprising:
    a return register adapted for storing a return address corresponding to the call instruction based on the instruction address and length of the call instruction.

11. The branch prediction unit of claim 1, wherein the encountered branch instruction comprises a call instruction having an instruction address and a length and the static predictor includes a return stack buffer adapted for storing a return address corresponding to the call instruction based on the instruction address and length of the call instruction.

12. The branch prediction unit of claim 1, wherein the encountered branch instruction comprises a direct branch instruction.

13. The branch prediction unit of claim 1, wherein the encountered branch instruction comprises a conditional backward branch instruction.

14. The branch prediction unit of claim 1, wherein the encountered branch instruction comprises a return branch instruction.

15. A microprocessor, comprising:
    a fetching unit adapted to retrieve program instructions, including branch instructions;
    a branch prediction unit adapted to receive the program instructions from the fetching unit, the branch prediction unit including:
        a first branch target buffer adapted to store branch history information on a first set of branch instructions;
        a second branch target buffer adapted to store branch history information on a second set of branch instructions; and
        a static predictor adapted to identify the branch instructions and determine a static branch prediction for at least each branch instruction not having associated branch history information stored in the first branch target buffer and the second branch target buffer;
    a decode unit adapted to receive the program instructions from the fetching unit in the order determined by the branch prediction unit and decode the program instructions into execution vectors; and
    an execution engine adapted to receive the execution vectors from the decode unit and execute the execution vectors, each branch instruction executed by the execution engine having an executed outcome, wherein the first branch target buffer is further adapted to allocate branch instructions of the first set of branch instructions based on the executed outcome and the second branch target buffer is further adapted to allocate branch instructions of the second set of branch instructions into the second branch target buffer based on the static prediction.

16. The microprocessor of claim 15, wherein the second branch target buffer is further adapted to deallocate branch instructions of the second set of branch instructions based on the executed outcome.

17. The microprocessor of claim 15, wherein the first branch target buffer comprises an N-way set associative cache.

18. The microprocessor of claim 15, wherein the second branch target buffer comprises a fully associative cache.

19. The microprocessor of claim 15, wherein the program instructions each have an associated instruction address and the branch history information in the first target buffer is indexed by at least a portion of the instruction address.

20. The microprocessor of claim 15, wherein the program instructions each have an associated instruction address and the branch history information in the second target buffer is indexed by at least a portion of the instruction address.

21. The microprocessor of claim 15, wherein the static predictor includes a branch resolution table adapted for storing the executed outcome.

22. The microprocessor of claim 15, the program instructions each having an associated instruction address, the branch instructions including call instructions and return instructions, further comprising:
a return register adapted for storing a return address corresponding to the instruction address of the program instruction following the call instruction and providing the return address when the return instruction corresponding to the call instruction is encountered.

23. The microprocessor of claim 15, wherein the program instructions each have an associated instruction address, the branch instructions include call instructions and return instructions, and the static predictor includes a return stack buffer adapted for storing a plurality of return addresses corresponding to the instruction addresses of the program instructions following the call instructions and providing a corresponding return address when the return instruction corresponding to the call instruction is encountered.

24. The microprocessor of claim 15, wherein the first set and the second set are mutually exclusive.

25. The microprocessor of claim 15, wherein the second set of branch instructions includes a direct branch instruction.

26. The microprocessor of claim 15, wherein the second set of branch instructions includes a conditional backward branch instruction.

27. The microprocessor of claim 15, wherein the second set of branch instructions includes a return branch instruction.

28. A method for predicting program branches in a microprocessor, comprising the steps of:
fetching a program instruction to be executed by the microprocessor;
determining if an entry corresponding to the program instruction is stored in a first branch target buffer;
determining if an entry corresponding to the program instruction is stored in a second branch target buffer;
determining if the program instruction is a branch instruction;
determining a static prediction for the branch instruction; and
allocating a branch history entry in the second branch target buffer based on the static prediction if the first and second branch target buffers do not contain entries corresponding to the program instruction.

29. The method of claim 28, further comprising:
executing the branch instruction; and
determining an executed outcome for the branch instruction.

30. The method of claim 29, further comprising:
allocating a branch history entry in the first branch target buffer based on the executed outcome.

31. The method of claim 30, further comprising:
deallocating the branch history entry in the second branch target buffer corresponding to the branch instruction based on the executed outcome.

32. A computer system, comprising:
an external memory containing a plurality of instructions; and
a microprocessor coupled to the external memory, the microprocessor including:
a fetching unit adapted to retrieve program instructions, including branch instructions;
a branch prediction unit adapted to receive the program instructions from the fetching unit, the branch prediction unit including:
a static predictor adapted to identify the branch instructions and determine a static branch prediction for at least each branch instruction not having associated branch history information stored in the first branch target buffer and the second branch target buffer;
a decode unit adapted to receive the program instructions from the fetching unit in the order determined by the branch prediction unit and decode the program instructions into execution vectors; and
an execution engine adapted to receive the execution vectors from the decode unit and execute the execution vectors, each branch instruction executed by the execution engine having an executed outcome, wherein the first branch target buffer is further adapted to allocate branch instructions of the first set of branch instructions based on the executed outcome and the second branch target buffer is further adapted to allocate branch instructions of the second set of branch instructions into the second branch target buffer based on the static prediction.

33. The computer system of claim 32, wherein the second branch target buffer is further adapted to deallocate branch instructions of the second set of branch instructions based on the executed outcome.

* * * * *